United States Patent [19]

Huffman et al.

[11] Patent Number: 4,595,907
[45] Date of Patent: Jun. 17, 1986

[54] PCM DATA TRANSLATING APPARATUS

[75] Inventors: Charles E. Huffman; Stephen R. Southerland, both of Plano, Tex.

[73] Assignee: Rockwell International Corporation, El Segundo, Calif.

[21] Appl. No.: 529,247

[22] Filed: Sep. 6, 1983

[51] Int. Cl.[4] .................................................. H04J 3/06
[52] U.S. Cl. ................................ 340/347 DD; 370/99
[58] Field of Search .................. 340/347 DD; 370/18, 370/42, 99

[56] References Cited

U.S. PATENT DOCUMENTS 4,138,596 2/1979 Roche ..................................... 370/99
4,154,985 5/1979 Munter ................................... 370/99

Primary Examiner—Clifford C. Shaw
Attorney, Agent, or Firm—Bruce C. Lutz; V. L. Sewell; H. Fredrick Hamann

[57] ABSTRACT

An interface device for use between a North American PCM channel bank and a CCITT PCM channel bank which allows data to stay in digital format rather than being converted to voice frequency. The interface takes care of not only the completely different serial data rates, but the different transfer characteristics of the channel data words. Synchronization is obtained by dividing the serial data stream into enough channel banks so that there is less than one-half cycle time period difference between the frequency of the incoming and outgoing data streams for one cycle of channel data words.

8 Claims, 17 Drawing Figures

PCM DATA TRANSLATING APPARATUS

THE INVENTION

The present invention is generally concerned with electronics and, more specifically concerned with communications. Even more specifically, it is concerned with an interface device for North American PCM channel banks and CCITT PCM channel banks wherein the interface is completely digital.

A normal solution to interfacing between North American PCM channel banks and CCITT PCM channel banks is to reduce the digital information to voice frequency and then redigitize it. The reason for this prior art approach is that not only are the serial data rates completely different, but in addition, the transfer characteristics of the data words are different. The North American channel banks impress a Mu-law transfer function on the voice channels, whereas the CCITT channel banks use A-law. Further, the frame formats are different for the channel banks in the two different systems. A problem with this approach is that the voice signal is degraded and there is much more likelihood of error in this prior art approach than there is in the present concept.

The present concept relies on the fact that for pure data, the serial bit streams used in the above-mentioned data streams can be considered to be identical for a given number of data channels. The North American data stream periodically inserts a single signalling bit in the channel data stream whereas the CCITT approach is to use two channels for solely signalling instead of data. In order to translate from T1 to CCITT operation, the T1 signal is converted to a bipolar signal with non-return-to-zero (NRZ) clock and data, and the serial data is demultiplexed into three data buses and a signalling line. The three data buses are translated in time with a sync pulse obtained from the demultiplexing. Both the T1 receiver and the CCITT transmitter are synchronized with a common timing signal which is a submultiple of the incoming data stream. The translator converts the data from Mu-law to A-law and also provides a delayed sync pulse and delayed signalling for integrating the channel data on the three buses into the CCITT frame format.

The inverse operation of converting a CCITT data stream to a T1 data stream is apparent to those skilled in the art from the above information.

It is therefore an object of the present invention to provide an improved direct digital interface between two different frequency data streams.

Other objects and advantages of the present invention may be ascertained from a reading of the specification and appended claims in conjunction with the drawings wherein:

Figure 2:
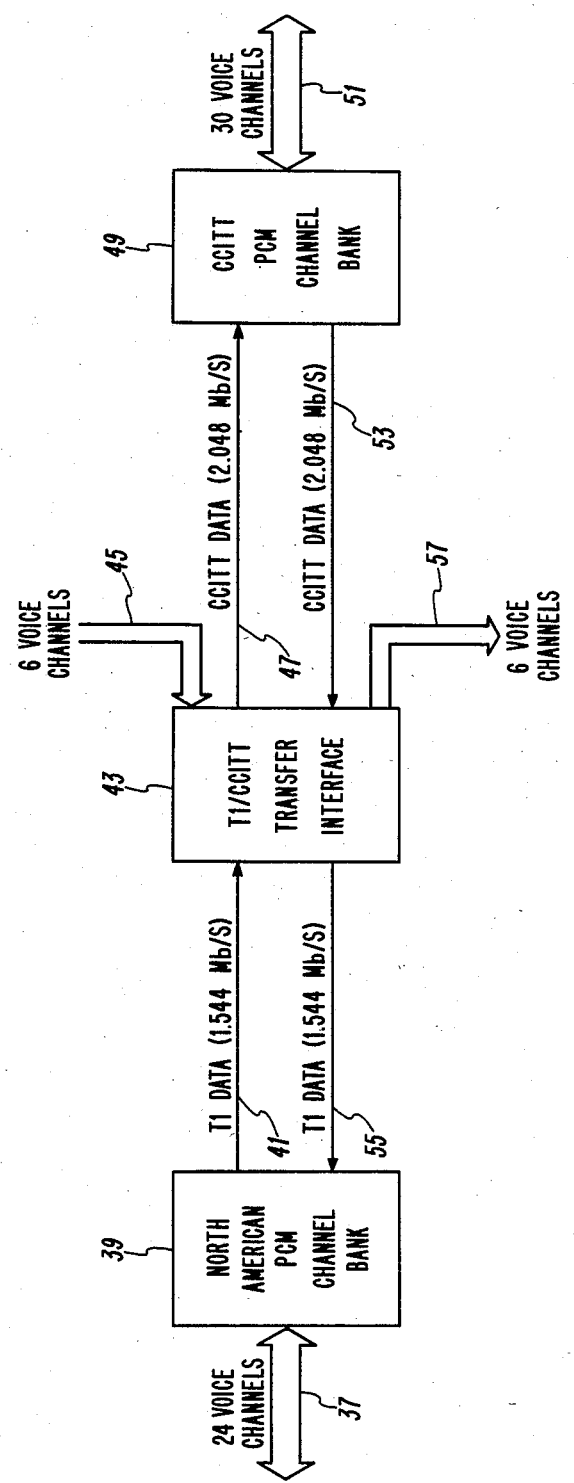
FIG. 2 is a block diagram showing the interface of the present invention.
Figure 6:
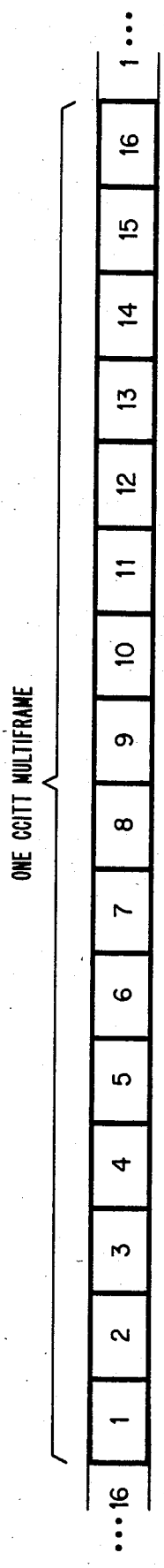
FIG. 6 illustrates one multiframe of the CCITT PCM channel bank data stream.
Figure 7:
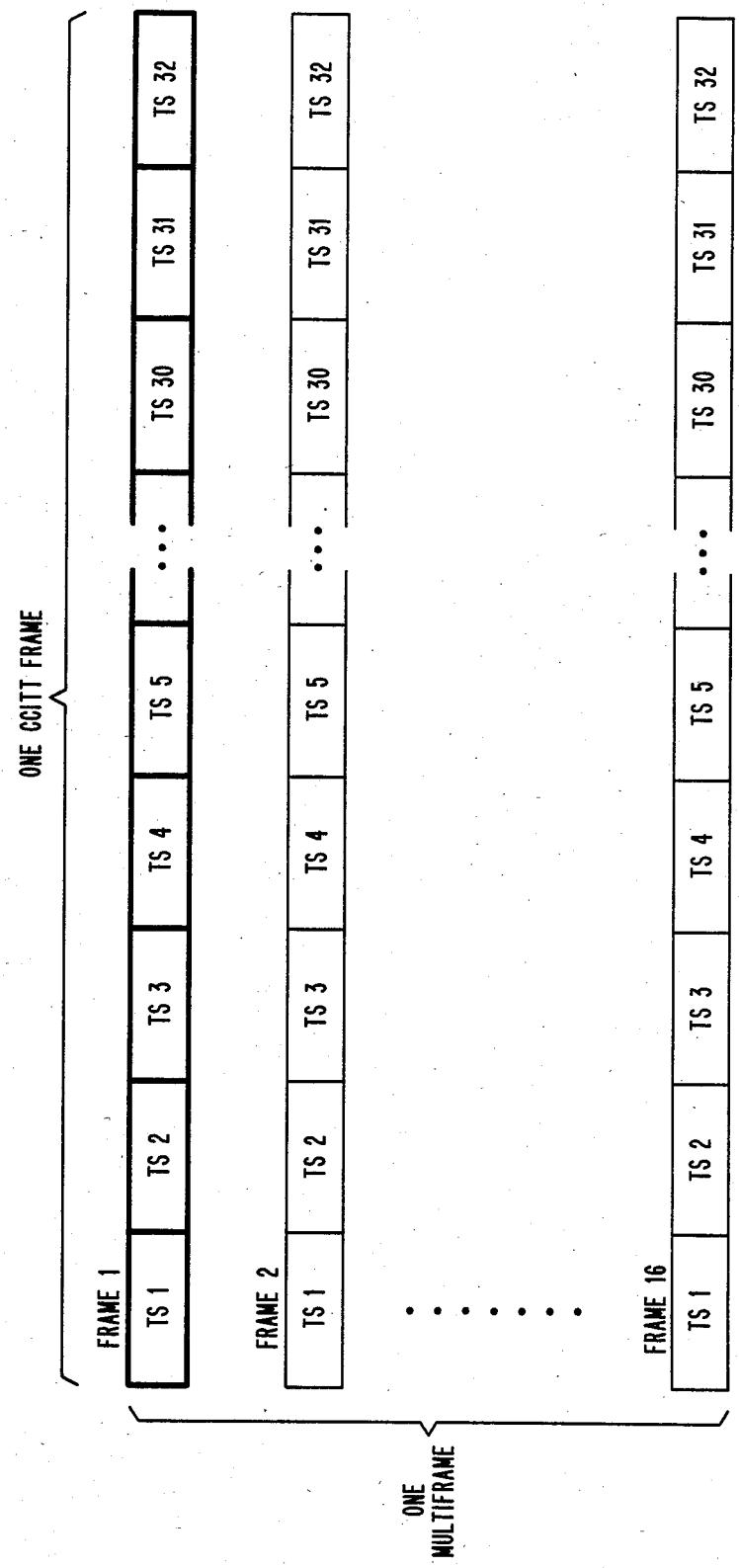
Figure 8:
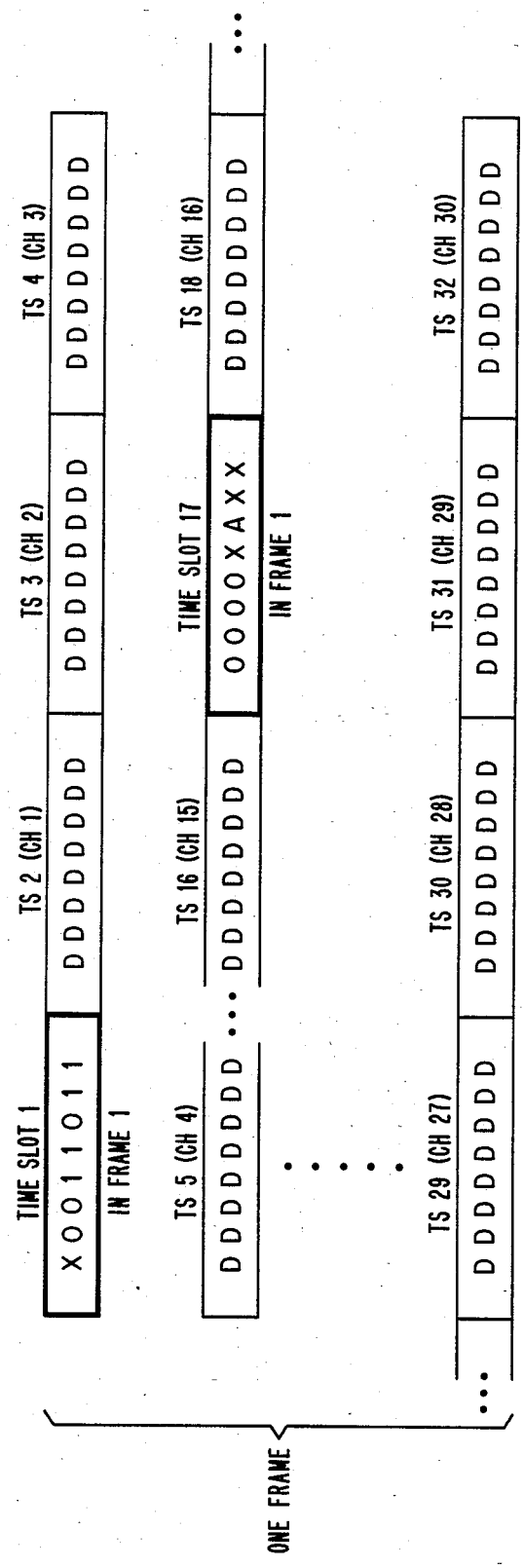
Figure 9:
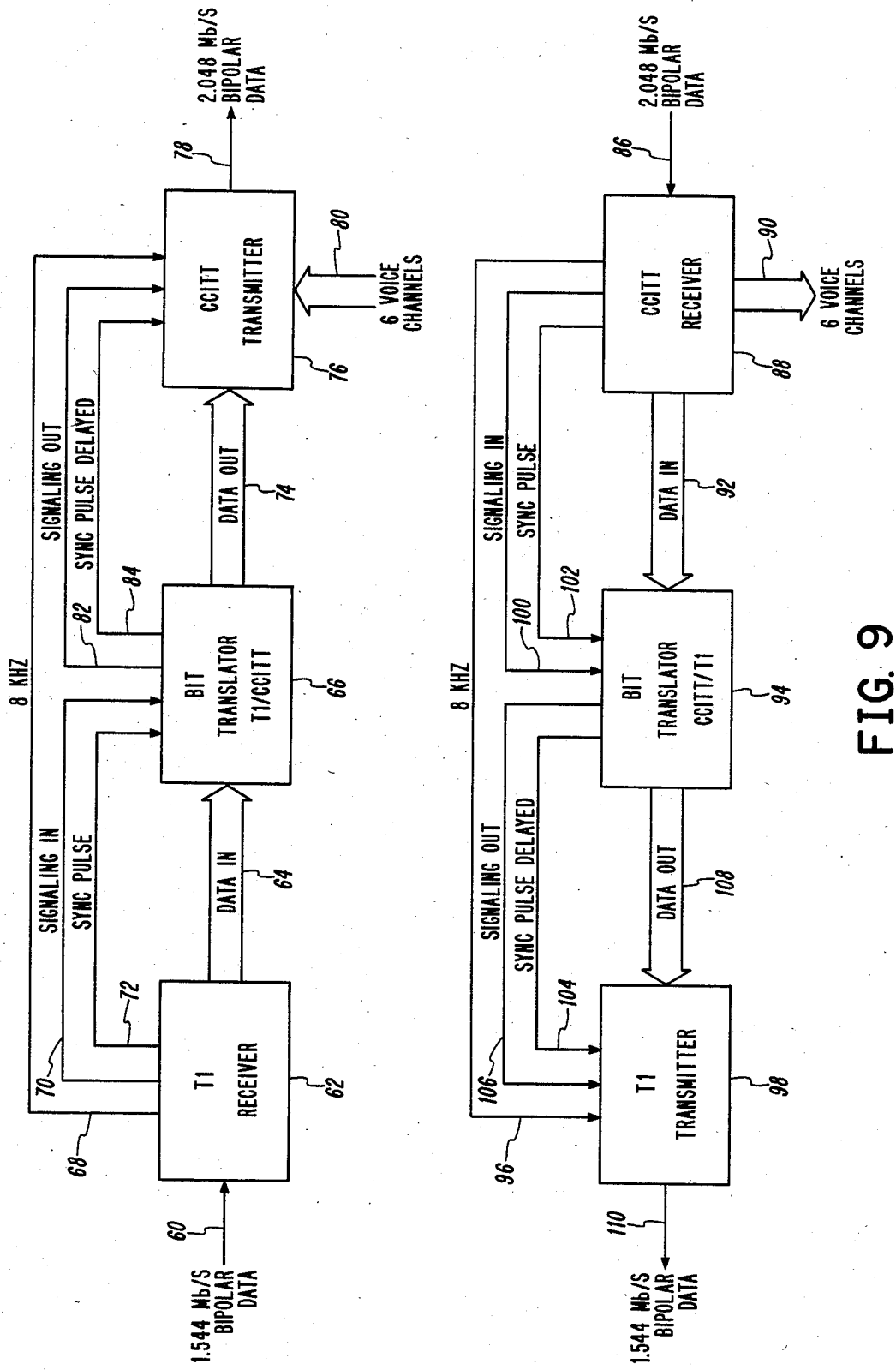
Figure 10:
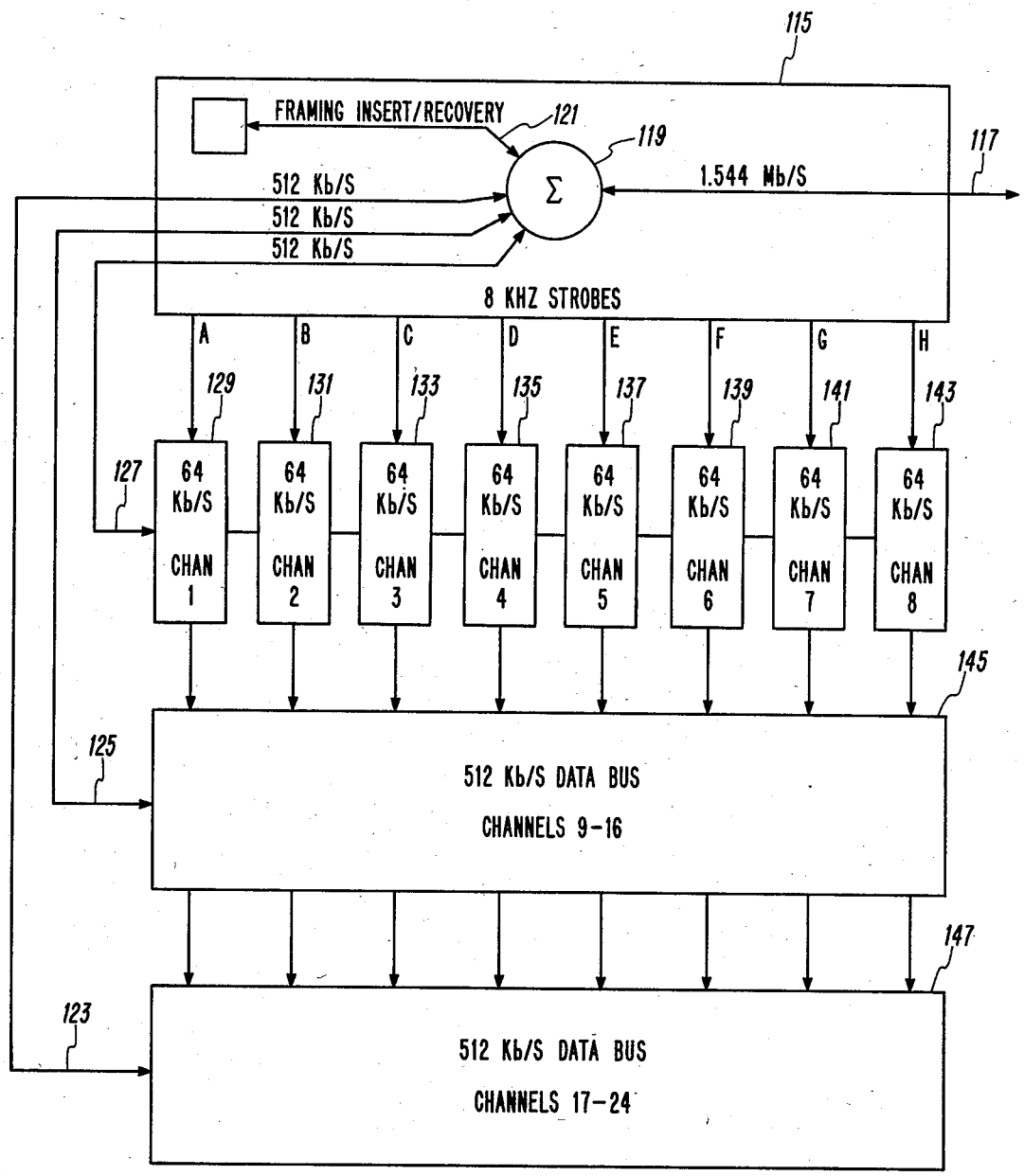
Figure 11:
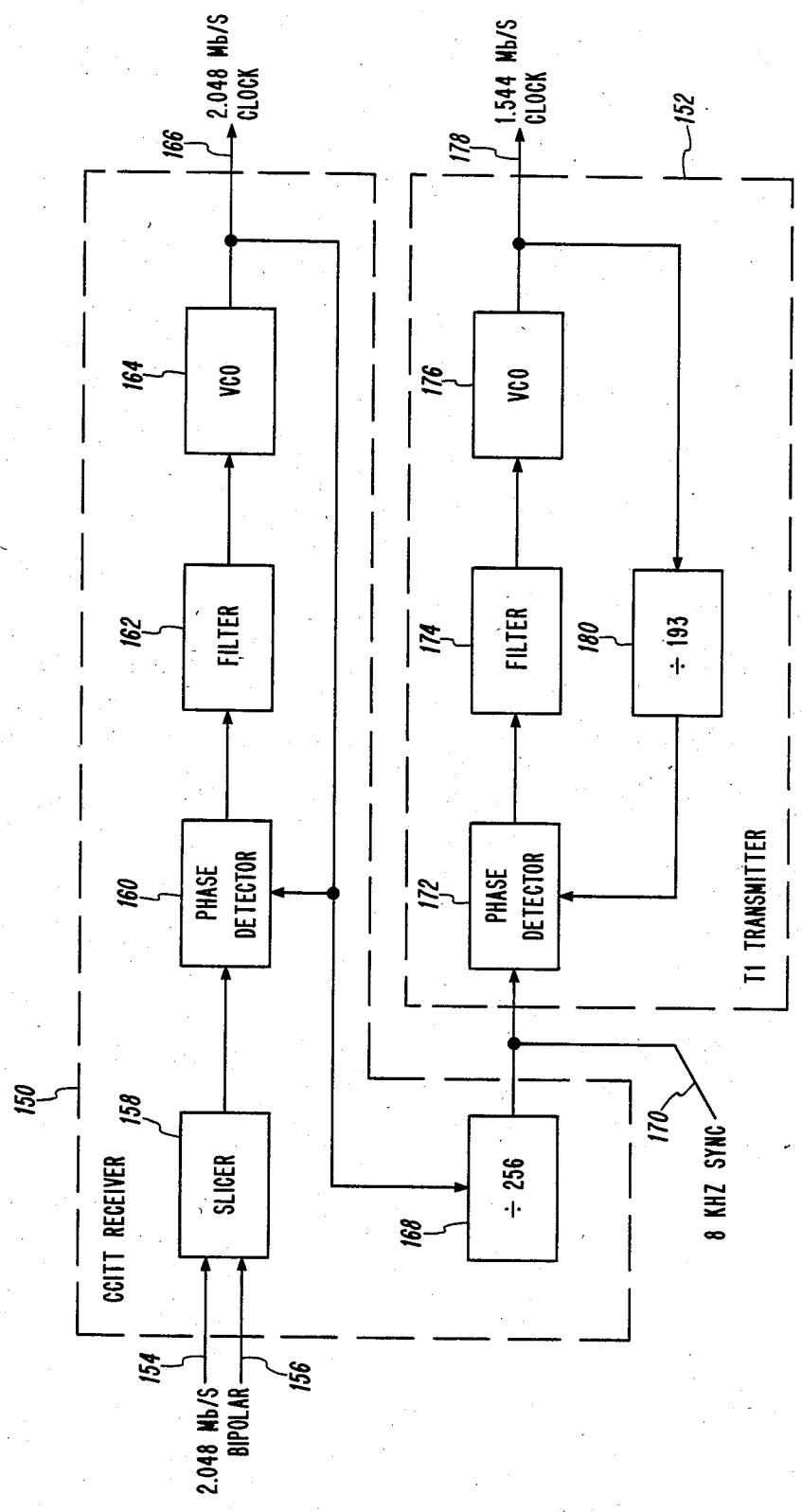
Figure 12:
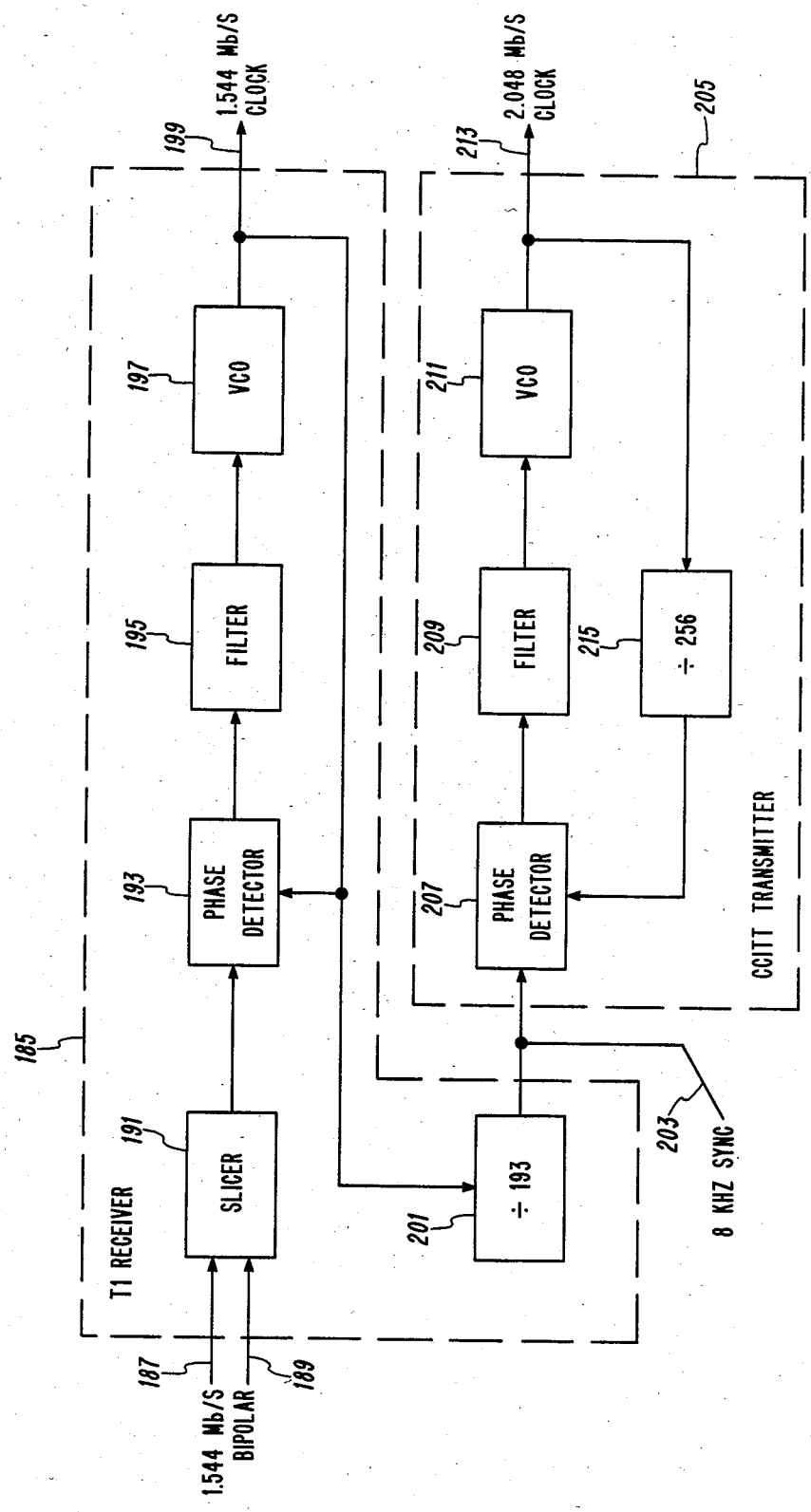
Figure 13:
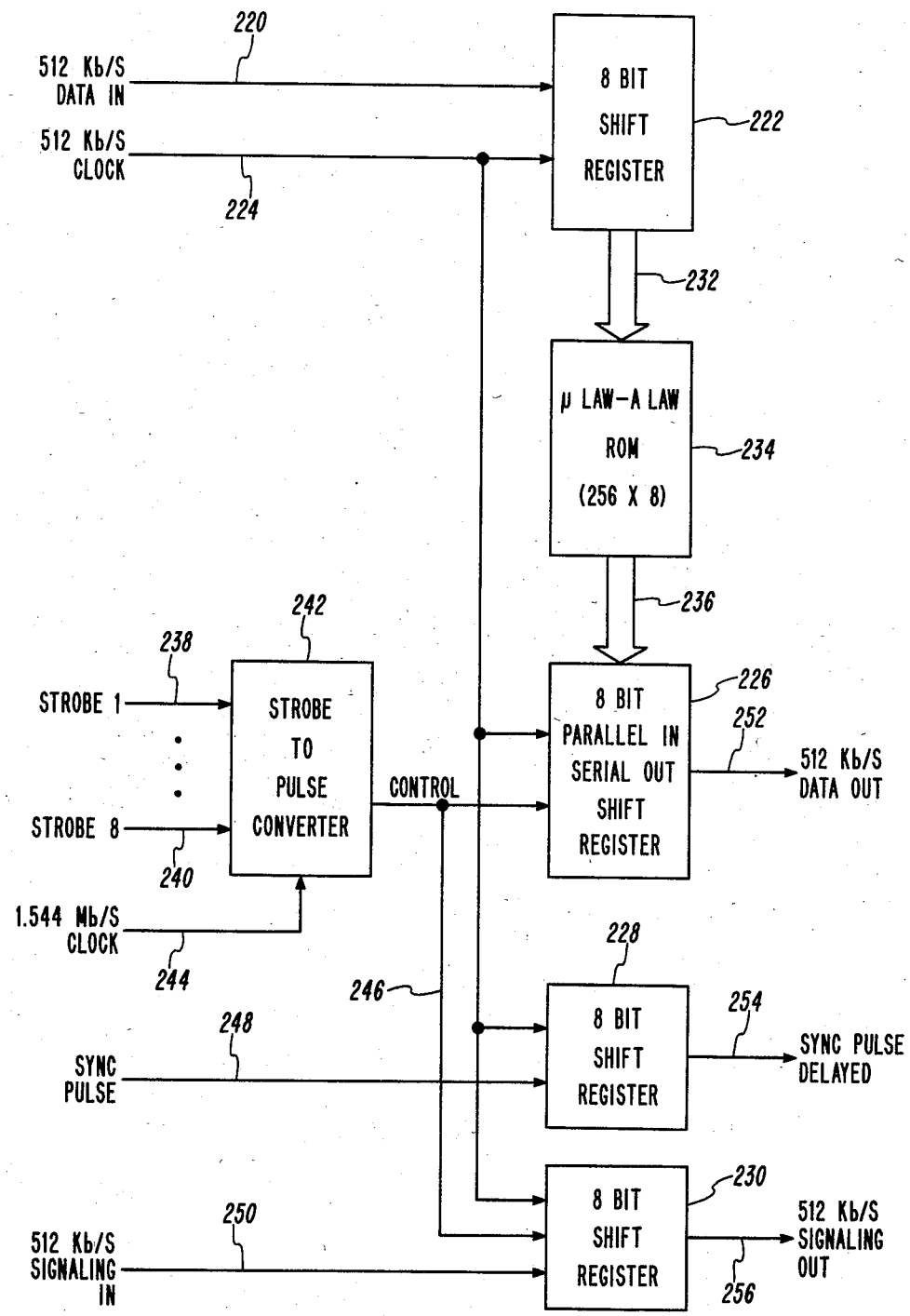
Figure 14:
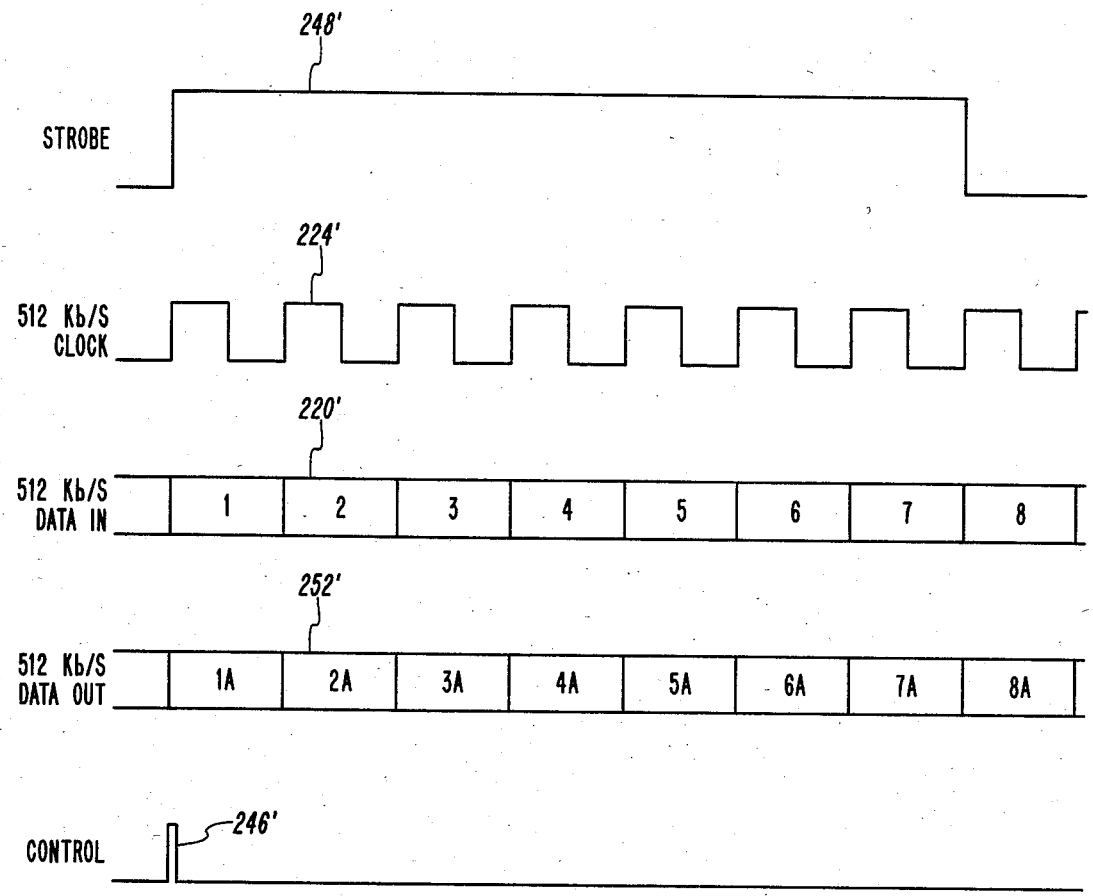
Figure 15:
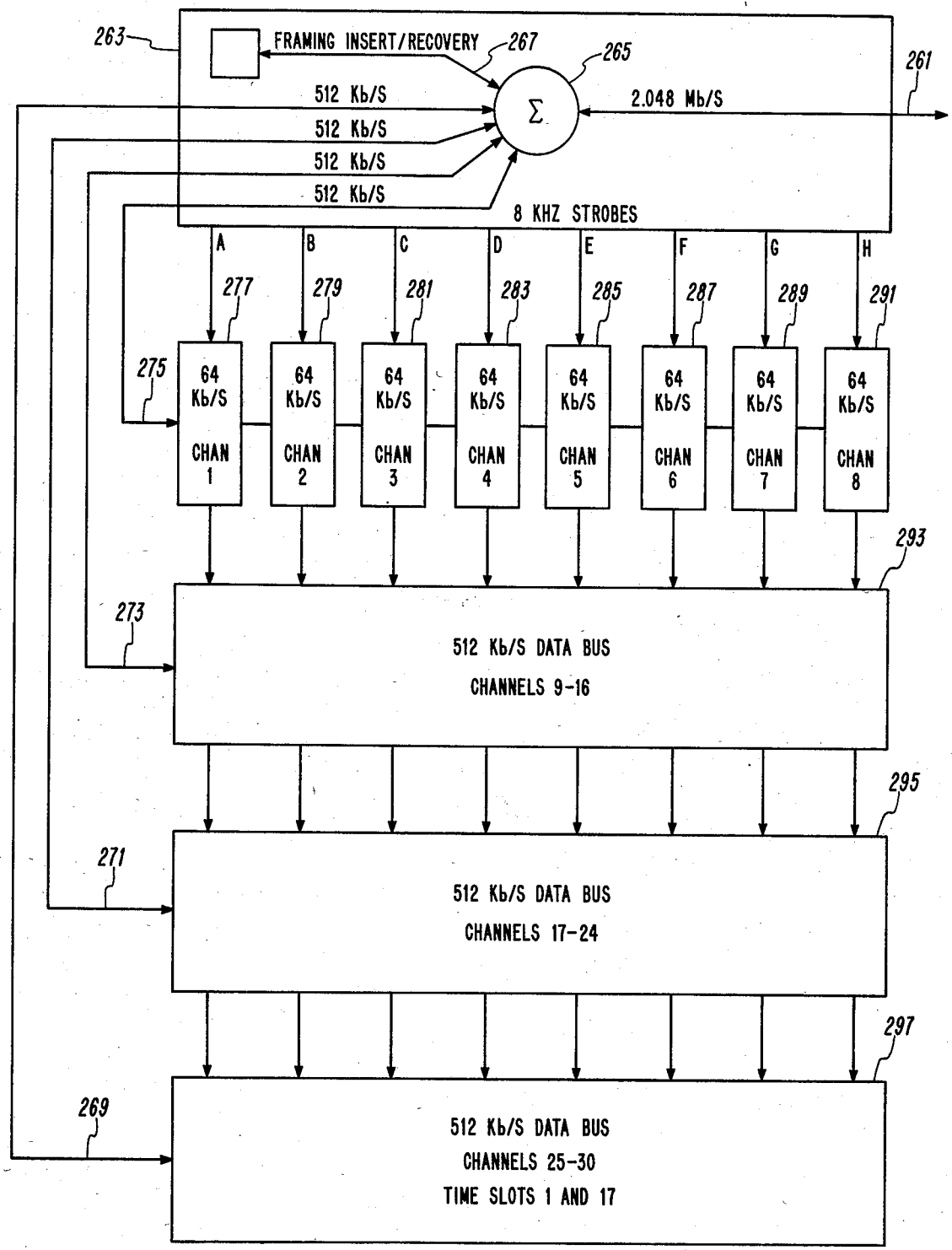
Figure 16:
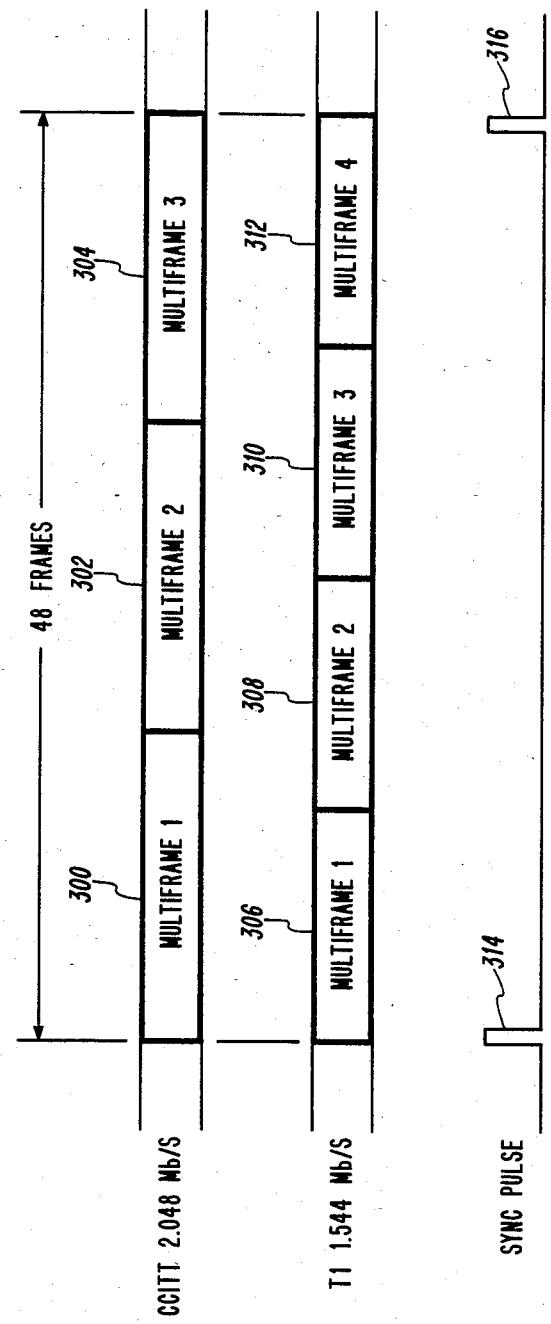
Figure 17:
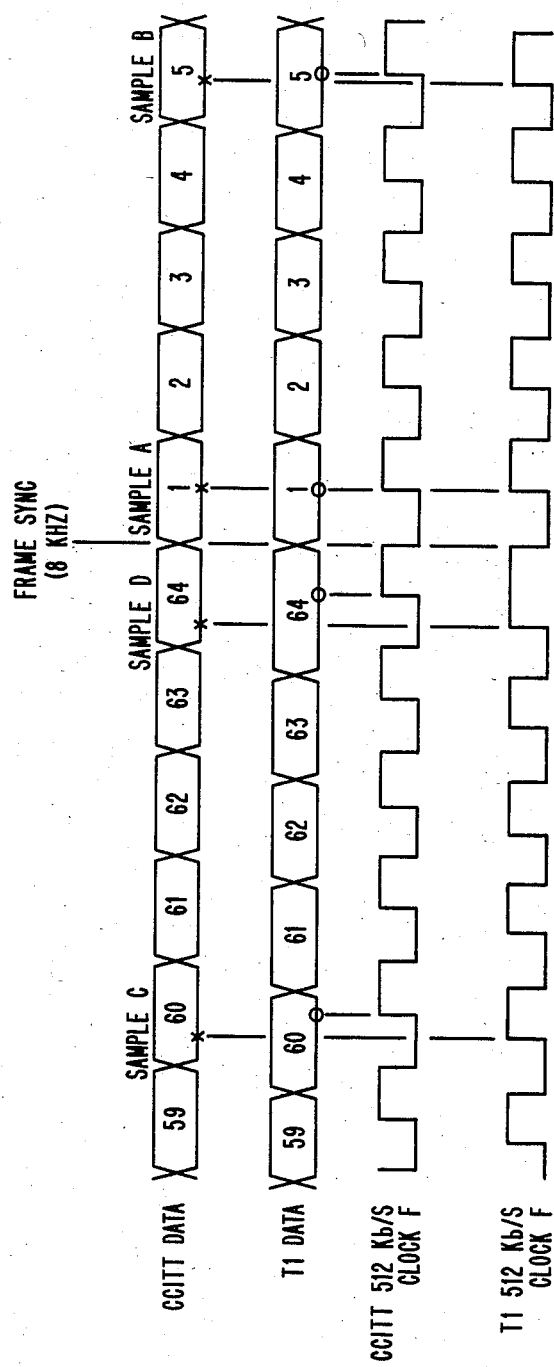

FIG. 7 provides more detail as to the contents of the individual frames of the multiframe of FIG. 6;

FIG. 8 provides more detail as to the data in one frame of FIG. 7;

FIG. 9 provides detail in block diagram form of the interface unit of FIG. 2;

FIG. 10 provides detail as to the bus structure between the T1 receiver and the bit translator of FIG. 9;

FIG. 11 provides more detail as to the T1/CCITT synchronization as would be provided in the lower part of FIG. 9;

FIG. 12 illustrates CCITT/T1 synchronization as would be obtained in the upper part of FIG. 9;

FIG. 13 shows the bit translator as used in the upper part of FIG. 9;

FIG. 14 is a timing diagram used in conjunction with the explanation of FIG. 14;

FIG. 15 shows in block diagram form the bus structure for the lower part of FIG. 9 between the CCITT receiver and the translator;

FIG. 16 shows a comparison between sets of multiframes in the two types of channel banks and the synchronization used in the present inventive concept; and FIG. 17 is a timing diagram illustrating the clock and data relationships between the CCITT and T1 signal formats.

DETAILED DESCRIPTION

Figure 1:
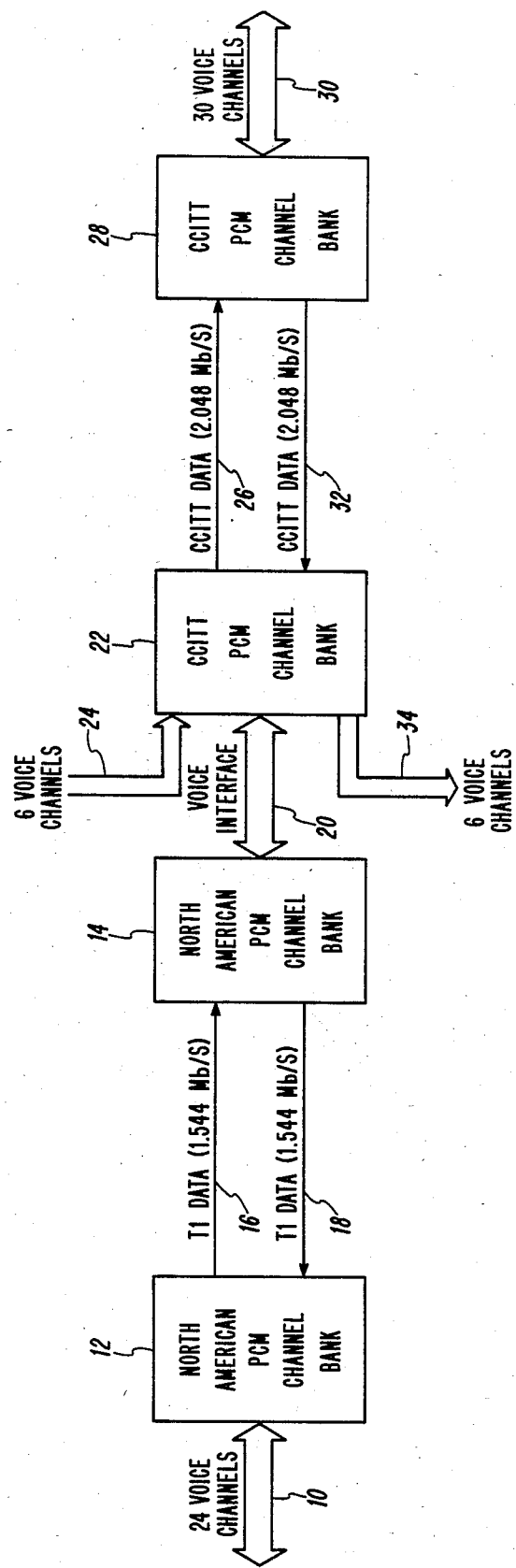
FIG. 1 is an approach that would have been used in the prior art to solve the interface problem.

In FIG. 1, 24 voice channels are supplied on a plurality of lines 10 to a North American PCM channel bank 12 where they are converted to digital data in a serial data bit stream at 1.544 megabits per second and transmitted to a downstream channel bank 14 via a line 16. Data is returned in the same format on a line 18 from 14 to 12 to be returned to a customer via line 10. The channel bank 14 reconverts the digital data to voice and transmits 24 voice channels of information on a two-way line 20 to a CCITT PCM channel bank 22. Since the CCITT system is designed to handle thirty voice channels, an additional six voice channels may be received from nearby customers on a plurality of leads 24. The voice information from 20 and 24 is converted to digital data and supplied on a lead 26 in serial format to a further CCITT PCM channel bank 28, where it is converted to voice information for thirty channels and distributed to customers via a two-way set of leads 30. Information from the customers obtained on lead 30 is reconverted to data in PCM channel bank 28 and returned to channel bank 22 via a lead supplying serial data at 2.048 megabits per second on a lead 32. Within channel bank 22, the data is converted to voice and twenty-four of these channels are supplied on the parallel leads 20 and the remaining six are supplied on a set of leads 34 to nearby customers (normally the same ones as are connected to leads 24).

In FIG. 2, a plurality of voice channels 37 is connected to a North American PCM channel bank 39 where the voice information is converted into a serial data stream at 1.544 megabits per second and conveyed on a lead 41 in digital format to a T1/CCITT transfer interface 43. Within the transfer interface 43 the digital data is converted to the CCITT format and this data is added to information from six voice channels brought in on a plurality of lines 45 and output on a lead 47 in the CCITT format of 2.048 megabits per second to a further CCITT PCM channel bank 49. This channel bank 49 is connected via a plurality of leads 51 to thirty customers using voice frequencies rather than digital data frequencies. Information is returned from bank 49 to interface 43 via a serial data lead 53 and from 43 to bank 39 via a lead 55 similar to that of lead 41. The interface 43 reroutes six of the data channels, converts these to voice channels and outputs them on a plurality of leads 57.

Figure 3:
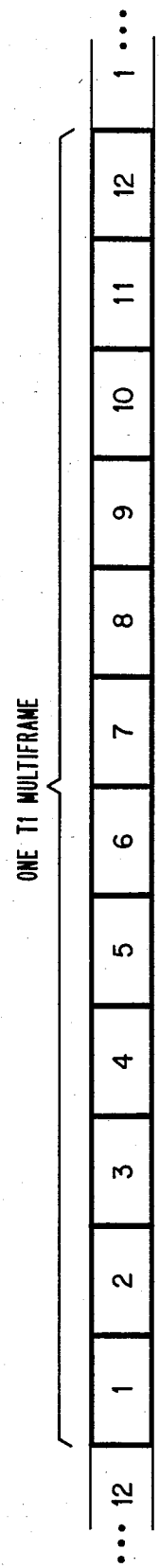
FIG. 3 shows a repeating sequence of frames of data which is designated for the T1 or North American PCM channel bank as a multiframe.

In FIG. 3, a repeating sequence of T1 frames of data in serial data format is illustrated wherein twelve frames comprise one multiframe and after the twelfth frame the type of frame alignment information within the multiframe repeats. Each of the numbers within the boxes of FIG. 3 are frame numbers as will be ascertained from later discussions and each multiframe in one embodiment of the invention contains 2,316 bits of information covering a time period of 1.5 milliseconds (1.544 megabits per second).

Figure 4:
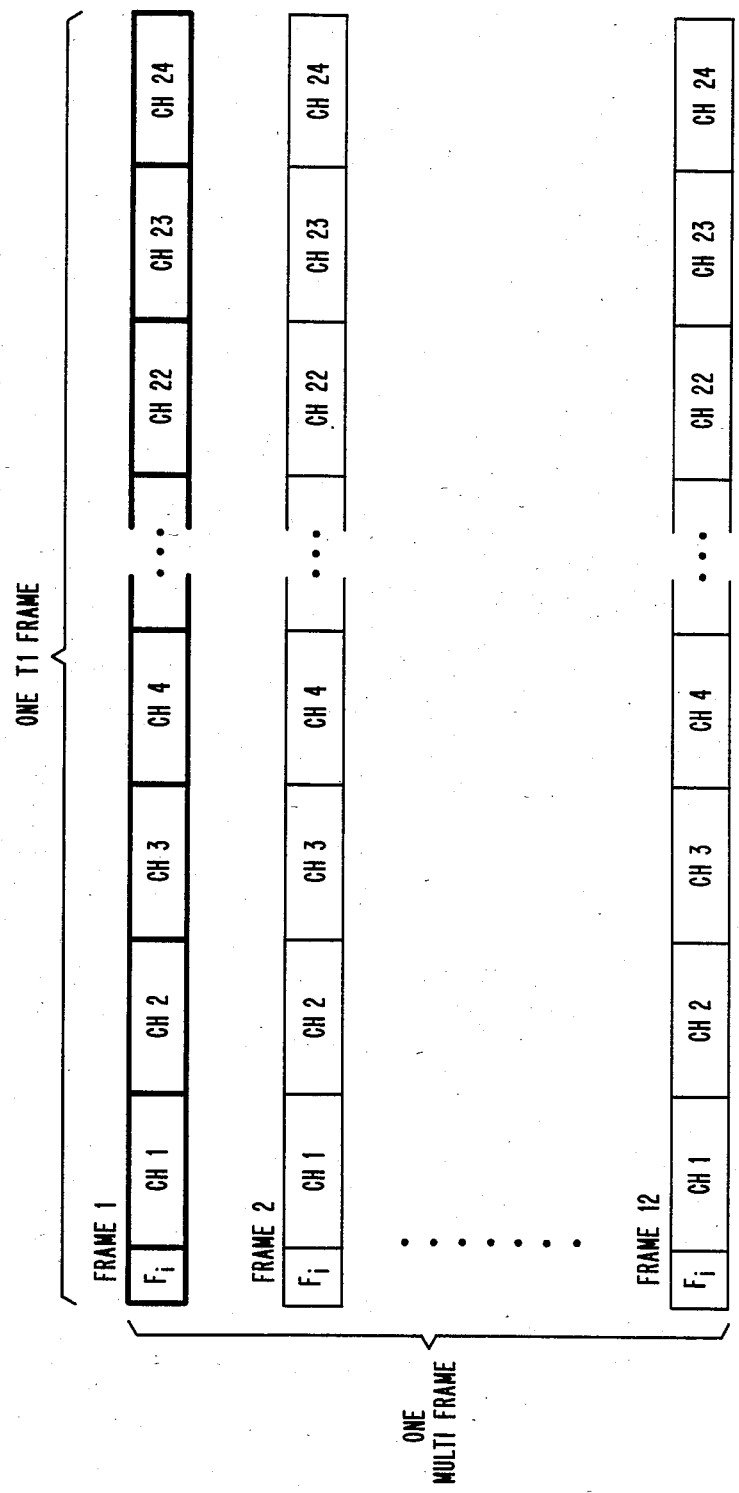
FIG. 4 is a breakdown of the contents of FIG. 3 showing more detail as to the data found in each of the frames of the multiframe.

FIG. 4 illustrates in more detail the data of FIG. 3. As shown, each frame starts with a frame alignment bit labeled $F_i$. The frame then contains twenty-four channels of data. Each frame including the framing bit is transmitted in a period of 125 microseconds which is equivalent to a frequency of occurrence of 8 KHz. Each frame contains 193 bits with 192 of these bits being data and a single bit being frame alignment information. As is well known to those skilled in the T1 standardized architecture as set up by Western Electric and Bell Labs, the odd numbered frames use the framing bit for frame alignment, while in the even numbered frames the frame alignment bit is used for multiframe alignment. The framing bit in frame No. 12 is normally equal to zero, but can be transmitted to indicate remote multiframe alarm when this bit is set equal to one.

Figure 5:
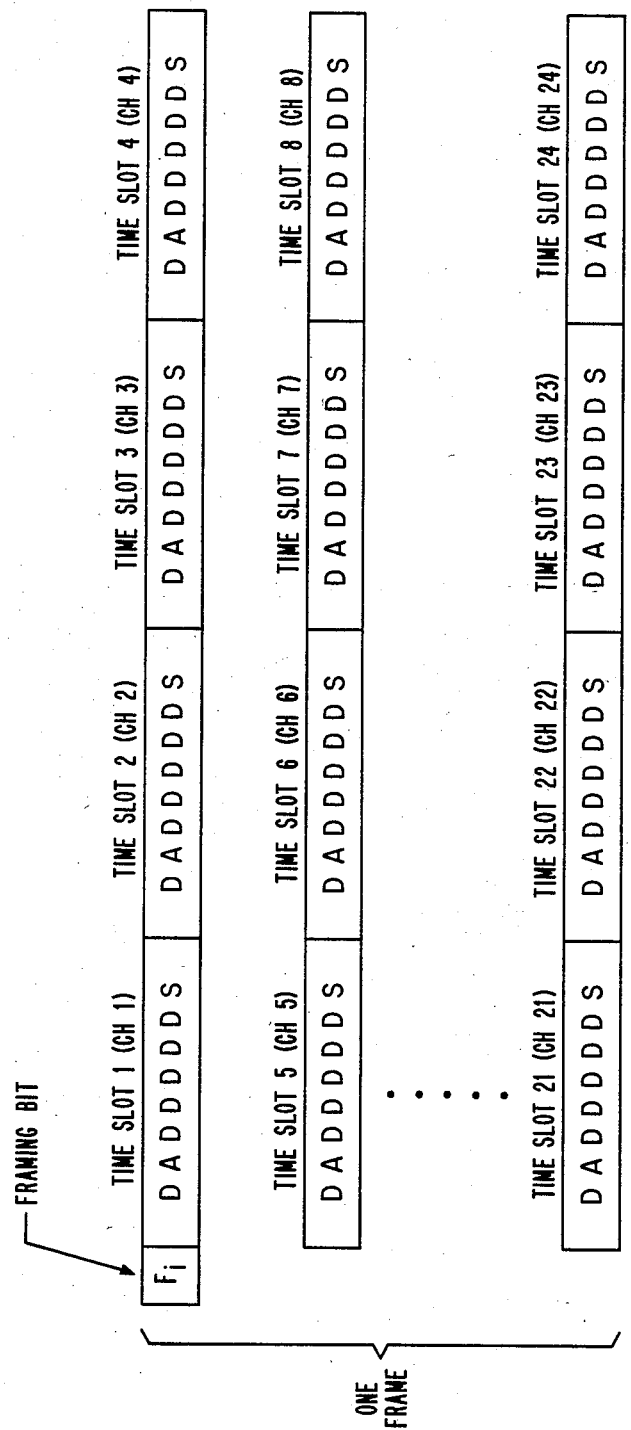
FIG. 5 is an illustration of more detail of the information shown in FIG. 4.

In FIG. 5, the contents of one channel of information as shown in FIG. 4 is broken down into more detail showing the framing bit and the time slots along with the types of data contained within the time slot. Each time slot is a byte comprising 8 bits, which byte occurs in a time period of 5.18 microseconds, with the individual bits being generated at 1.544 megabits per second. The D's in the time slots indicate data bits of an 8 bit channel sample. The A in the time slots indicates data bits which are forced to zero when a local alarm condition occurs to transmit a remote alarm to the far end. When this alarm occurs, all of the A bits (the second bit in each time slot) are forced to zero. The S indicates data bits which are forced to represent the signalling bits of each channel. This, of course, follows a very standardized format as outlined in standardized procedures throughout North America. The attempt at compactness of data creates a problem in that the signalling bits cannot be readily and easily separated from the data since the two are intermixed, unlike the CCITT data streams to be described.

In FIG. 6, one CCITT multiframe contains sixteen frames of information. The multiframe is transmitted over 2 milliseconds of time and this multiframe contains 4,096 bits being generated at 2.048 megabits per second. As before, in FIG. 3, the numbers in the boxes are frame numbers.

In FIG. 7, a multiframe is shown with each of the sixteen frames being represented. A single frame includes 32 time slots for a total time of 125 microseconds and thus the time slots occur at a rate of 8 KHz. Each time slot contains 256 bits of information being transmitted at 2.048 megabits per second. Time slot 1 in the odd numbered frames is used for frame alignment and contains an alternate frame alignment bit in the even numbered frames.

FIG. 8 provides more detail as to a single frame of CCITT information. Again the format is very standardized in Europe where each time slot is 8 bits wide and covers a period of 3.9 microseconds. This translates to 2.048 megabits per second. The D's indicate data bits of an 8 bit channel sample and it will be noted that only data is contained in 30 of the 32 time slots. In other words, time slots 1 and 17 are used for signalling. The X bits in the two time slots 1 and 17 are bits used for international purposes as logic one unless otherwise specified. The A bits are bits which are logic zero unless forced to a logic one by an alarm condition. While no A bit is shown in frame 1, the third bit would be an A bit in even frames and the last five bits would be X bits in even frames. The format shown for frame 1 is for odd frames. The alarm bit in time slot 1 indicates a frame alarm and an alarm bit in time slot 17 indicates a multiframe alarm. Again it must be emphasized that the signalling is very standardized and well known throughout the telecommunications art and is merely being repeated herein to indicate that this problem is recognized as one of the interfacing problems that has been successfully contended with in this inventive concept.

In FIG. 9, a 1.544 megabit per second serial data stream of bipolar data is provided on a lead 60 to a T1 receiver 62 which has a plurality of leads 64 comprising three data banks supplying data to a bit translator 66. Also output from T1 receiver 62 are a plurality of leads 68, 70 and 72 providing an 8 KHz sync, signalling-in and sync pulse signals respectively. The bit translator 66 provides the same data translated via a transfer function from Mu-law to A-law on a plurality of leads 74 to a CCITT transmitter 76 having a single output lead 78 of serial data occurring at the 2.048 megabits per second. The transmitter 76 receives six parallel channels of voice on a plurality of leads 80 and is also connected to receive the lead 68 from T1 receiver 62. The bit translator 66 also provides output of signalling and delayed sync pulses on leads 82 and 84 respectively to the transmitter 76.

In the lower portion of FIG. 9, a 2.048 megabit per second bipolar data signal is supplied on lead 86 to a CCITT receiver 88 which divides off 6 of these channels of information onto a plurality of voice channel leads 90. The remaining data is supplied on a plurality of three channels of data in a plurality of leads 92 to a bit translator 94. The receiver 88 detects an 8 KHz signal from the incoming data and supplies this signal on a lead 96 to a T1 transmitter 98. The receiver 88 also provides signalling and sync pulse information on leads 100 and 102 respectively to the translator 94. A sync pulse delayed signal is supplied on a lead 104 from translator 94 to the T1 transmitter 98 and further signalling information is provided on lead 106 to the transmitter 98. After the data is translated from A-law to Mu-law in translator 94, it is output on a plurality of channels 108 to the T1 transmitter 98 where the data is combined with signalling information and output on lead 110 as a 1.544 megabit per second stream of bipolar data.

In FIG. 10, a serial data bit stream is shown coming into a block 115 on a line 117. This data is redistributed in a unit 119 so that the framing bit information is output on a lead 121 and three different channels of data are output on leads 123, 125 and 127.

The block 119 would be a detector when data is input into the apparatus of FIG. 10 on lead 117 and would be a summation circuit when it is output on lead 117. FIG. 10 is a representation of both dividing a bit stream into three data channels or combining three data channels into one data bit stream.

In the detection or demultiplexing mode, the upper set of blocks 129, 131, 133, 135, 137, 139, 141 and 143 are filled with data from the first eight time slots of a frame. These blocks 129 through 143 are strobed by 8 KHz strobe signals on leads A through H. These strobes also are applied to a similar set of eight blocks each in the 512 kilobit per second data bus block 145 and the similar block 147. Block 145 contains data for channels 9 through 16 while block 147 contains data for channels 17 through 24. As is shown, the lead 123 is applied to block 147 while lead 125 is applied to block 145. Each of these blocks, such as 129, is a complex dual shift register device which has a first portion, inputs information in series, then dumps it in parallel to a second portion having an output shift register. The output shift register then outputs the information at the appropriate time, while the first portion of the block is serially inputting additional data.

In FIG. 11, dash lines enclose a plurality of blocks which would normally constitute a CCITT receiver and this dash line enclosure is designated as 150. A further dash line block 152 includes electronic blocks normally found in a T1 transmitter. Enclosure 150 receives a 2.048 megabit per second data stream on a lead 154 and a further signal on lead 156 for creating a bipolar signal out of this data stream on 154. Both of these leads are applied to a slicer block 158 which provides output signals to a phase detector 160. Phase detector 160 is connected to supply signals to a filter 162 which operates on or affects the frequency of a VCO 164 having an output lead 166. Lead 166 is returned to the phase detector 160 in a feedback loop and also supplies signals to a divide-by-256 block 168 which creates as an output on lead 170 an 8 KHz synchronization pulse. This lead 170 supplies input signals to block 152 and to a phase detector 172 within said block. The output of phase detector 172 is supplied through a filter 174 to a VCO 176 and signals are output at the frequency of 1.544 megabits per second from VCO 176 on a lead 178. Lead 178 is returned to a divide by 193 block 180 for reducing the frequency of the signals to a value which will control the phase detector 172 in a feedback manner. As may be ascertained and as previously indicated in conjunction with the description of figures, FIG. 11 provides T1/CCITT synchronization as is required in the lower portion of FIG. 9.

The similar circuitry for the upper portion of FIG. 9 is found in FIG. 12 where a dash line block diagram 185 represents a T1 receiver having input leads 187 and 189 supplying signals to a slicer block 191. The output of slicer block 191 is provided through a phase detector 193 and a filter 195 to a VCO 197 which provides 1.544 megabit per second clock signals on a lead 199. Lead 199 returns signals to the phase detector 193 in phase lock loop fashion and also to a divide-by-193 block 201. The output of block 201 is an 8 KHz synchronization signal supplied on a lead 203 to a dash line block 205 representing the contents of a CCITT transmitter, and in particular, the 8 KHz sync signal is supplied to a phase detector 207 which has an output signal provided through a filter 209 to a VCO 211. The output of VCO 211 is a 2.048 megabit per second clock signal supplied on a lead 213. This signal is divided in a divider block 215 and returned to the phase detector 207 in a phase lock loop feedback manner.

In FIG. 13, a bit translator of the type required for block 66 in FIG. 9 is illustrated. In the present figure, a DATA-IN line 220 supplies data to an 8 bit shift register 222. A 512 kilobit per second clock signal is supplied on a lead 224, not only to 8 bit shift register 222 but also to an 8 bit parallel in serial out shift register 226, an 8 bit shift register 228 and a further 8 bit shift register 230. A plurality of leads 232 supplies 8 bits of signal at a time from shift register 222 to a ROM 234 which provides a Mu-law to A-law conversion. Output signals from ROM 234 are supplied on a plurality of leads 236 to the register 226. Strobe signals on leads 238 through 240 are input to a strobe-to-pulse converter 242 which receives a 1.544 megabit per second clock signal on lead 244. An output of converter 242 operates the register 226 and the register 230 through signals on a control lead 246. A sync pulse is provided on a lead 248 to register 228. A 512 kilobit per second SIGNALLING IN lead 250 supplies further signals to the register 230. 512 kilobit per second data is output from register 226 on a lead 252. A delayed sync pulse is output from register 228 on a lead 254 while signalling information that is synchronized with the remaining circuitry is output from register 230 on a lead 256.

FIG. 14 illustrates the timing of signals with an appropriate prime indicating where the signal is found in FIG. 13. In other words, the strobe pulse 248' is that found on sync pulse lead 248. The clock signal is given designation 224', the DATA-IN signal is given the designation 220' and the output data is given the designation 252'.

In FIG. 15, the CCITT bus structure is illustrated in block diagram form with 2.048 megabit per second data being transferred on a lead 261 to a block 263 which contains summing or demultiplexing means 265. When the apparatus of FIG. 15 is used to receive and demultiplex information, block 265 is a demultiplexer and provides as an output signal a framing recovery signal on a lead 267 and four channels of data at 512 kilobits per second on leads 269, 271, 273 and 275. The data on lead 275 is supplied to a plurality of blocks designated as 277, 279, 281, 283, 285, 287, 289 and 291. The data is input serially into these blocks in a manner substantially identical to that of the similar blocks of FIG. 10. Each of these blocks is strobed by a lead labeled appropriately A through H. The set of blocks 277 through 291 contain channels 1 through 8 while a further block 293 connected to receive signals on 273 receives channels 9 through 13. A block 295 connected to receive signals on lead 271 receives channels 17 through 24 and the block 297 receives signals on lead 269 representing channels 25 through 30 as well as time slots 1 and 17.

FIG. 16 illustrates the relationship between the CCITT and the T1 multiframe repeating cycles. The sync pulse appears at 48 frame intervals of 6 milliseconds thereby occurring at 8 KHz. The 8 KHz is the largest common denominator and is used to keep the data in synchronization. This synchronization is required since the data channels are translated in real time although the signalling bits are stored, reformatted and output in the next multiframe. As will be ascertained, the T1 multiframe No. 4 signalling is deleted when data is being converted from T1 bit stream to CCITT or it is duplicated from T1 multiframe 3 when data is being transferred from CCITT format to T1 format. For convenience in designation, the three multiframes in the upper timing chart of FIG. 16 are given the designators 300, 302 and 304 while the four multiframes shown in the middle chart are given designators 306, 308, 310 and 312. The two sync pulses in the lower portion of the timing diagram are given designators 314 and 316.

In FIG. 17, the relative relationship of clock and data for a given 12 kilobit data bus channel is shown. The numbers in the boxes of the upper two timing diagrams labeled CCITT Data and T1 Data are channel data bit numbers. As will be noted, the displayed waveforms illustrate the correction of the data bits and the T1 clock every 64th bit, so that there is never a "runaway of slewing" of data in one communication format with respect to the other. While the instantaneous clock frequency of the T1 clock is not identical with the raw data of the CCITT data signal and clock, the correction every 64th bit produces an average frequency which is identical.

OPERATION

The present invention shown in basic form in FIG. 2 eliminates a significant amount of hardware over the prior art of FIG. 1 and provides a direct digital interface 43 which eliminates the signal degradation resulting from the digital and analog conversions accomplished in 14 and 22 of FIG. 1. The data transfer system provides a means for transferring PCM digital data between the 1.544 megabit per second T1 data and the 2.048 megabit per second CCITT data. The problem solved by the present invention relates not only to the fact that the serial data rates are different but also the transfer characteristics of the 8 bit channel data words are different. As is known to those in the communication art, the North American channel banks impress a Mu-law transfer function on voice channels, whereas the CCITT channel banks use A-law. Further, the frame formats are different for the channel banks as shown in FIGS. 3 through 8.

In operation, the normal approach in the prior art, and continued in the present invention, is that the interface must drop and pick up six voice channels, since the T1 data format does not support as many channels of data as the CCITT. Thus, the six channel difference of 24 to 30 must be accommodated in some other way. However, for the data to be converted, the interface 43 removes the signalling information, so that all the information bits that are to be worked on are pure data. The pure data is then divided into a multiplicity of data buses of sufficient number to ensure that there is never a misalignment of the corresponding raw data bits of greater than one-half a clock cycle. As designed, this never exceeds more than one-third of a clock cycle. With the timing used, even though the instantaneous frequency of the two data streams is different, the average frequency is identical. Also with block 43, is a bit translator to convert the data from Mu-law to A-law or vice versa, depending upon the direction of data flow. When T1 data is input, it is demultiplexed into three data buses and after conversion in the translator, this data is combined with the local information for outputting in CCITT format. When CCITT data is input, this data stream is divided into four data buses, six channels of this data are output locally and two channels are converted from CCITT signalling format, to the T1 signalling format, so that the information can be integrated into the 1.544 output data bit stream.

FIG. 9 accomplishes the detection and distribution as summarized above. The T1 receiver 62 extracts an 8 KHz largest common denominator signal from the incoming data as well as extracting signalling-in and sync pulse data. Block 62 also takes the data and converts it to data buses which is output as 64. The conversion within T1 receiver 62 is accomplished in part by using a register of at least one frame in length so that the output of information is delayed in time only by approximately one frame of data. The first bit of each of channels 1, 9 and 18 is retrieved simultaneously from parallel output, and then the next bits until all the bits of the first byte in that channel are output. Then, the bits of bytes 2, 10 and 18 are output, etc. The bit translator 66 accomplishes the compression characteristic conversion. Due to the delays within bit translator 66, new signalling and sync pulses are derived and passed to the CCITT transmitter. The translated data is output on the data bus 74 to the CCITT transmitter where it is combined with the external voice channels and output on lead 78. The reverse technology occurs in converting CCITT data to T1 data, as shown in the lower part of FIG. 9. FIG. 10 illustrates the T1 transmitter of FIG. 9, either block 62 or 98, depending on the direction of data flow. If it is representing block 62, data is input on lead 117 and stored for a one frame delay in a register, not shown. This data follows the format as illustrated in FIGS. 3 through 5. The framing bit F1 of FIG. 5 or FIG. 4 is output on lead 121, while the data of channels 19 and 17 are simultaneously output on leads 127 through 123, respectively. In the next unit of time, the information for channels 2, 10 and 18 is output simultaneously. This data is supplied to the appropriate registers for output to the bit translator 66 at the appropriate time. If the transmitter of FIG. 10 is representative of transmitter 98 in FIG. 9, the data is input into the data buses and output on lines 123 through 127 at times dictated by the strobe leads A through H and input into the register within 119. The framing bit F1 is input at the appropriate time, and the information is then serially clocked out of the register and output on lead 117 of FIG. 10 which is the same as lead 110 of FIG. 9.

The frequency synchronization is accomplished in the manner shown in FIGS. 11 and 12. These timing circuits are shown in dash line enclosures to show which portions are found in which blocks of FIG. 9. As illustrated, CCITT data is input in FIG. 11 and a 2.048 megabit per second clock is derived through the use of a phase lock loop. This signal is then reduced by divider 168 to the largest common denominator frequency of 8 KHz, and then up-converted to a 1.544 megabit per second clock through another phase lock loop. The signal shown on lead 170 is representative of that on lead 96 of FIG. 9.

Similar comments hold for the operation of FIG. 12 in the upper portion of FIG. 9.

The bit translator of FIG. 13 performs the Mu-law to A-law conversion. This conversion is accomplished on each eight bit PCM word of the individual 512 kilobit per second data buses. In other words, FIG. 13 represents only one-third of the total conversion circuitry within bit translator 66. Likewise, there are three more translators similar to FIG. 13 in FIG. 9. While performing the data conversion, the sync pulse on lead 248 is delayed to coincide with the delays introduced in blocks 222, 234 and 226. The signalling clock 256 is also conditioned so that its instantaneous frequency is identical to the average frequency of the data input.

As mentioned previously, the T1 Bell System format is standardized in North America and is represented in FIGS. 3 through 5. The T1 format frame is composed of twenty-four 8 bit time slots used to carry the unit data and signalling. The CCITT 2.048 megabit time slot format is illustrated in FIGS. 6 through 8 and contains thirty-two 8 bit time slots for data signalling and overhead transmission. Discounting the effect of the T1 interleave framing bits, the common divisor of the 1.536 average megabits per second and the 2.048 megabit per second rate is illustrated in FIGS. 6 through 8 where it is shown that thirty-two 8 bit time slots are used for data, signalling and overhead transmission. Discounting the effect of the interleaved framing bits, it will be ascertained that the common divisor of the two signals is 512 kilobits per second. This results in the formation of three sections in T1 data streams and four sections in CCITT data streams. This division is shown in the two FIGS. 10 and 15, and as shown, each serial data bus contains eight 8 bit time slots with data bits transferred using the 512 kilobit per second clock. Each bus, such as 145 and 147, is strobed simultaneously with eight consecutive channel strobes A through H.

The structure for accomplishing CCITT conversion is shown in FIG. 15. The first three CCITT buses fed by leads 275, 273 and 271 carry channels 1 through 24 to allow compatibility with the twenty-four channels of T1 system of FIG. 10. The fourth CCITT bus 297 contains the last six data channels and the two overhead and signalling time slot data channels. In both transmit and receive 512 kilobit per second serial bus directions, channel data bits are output on the bus at the falling edge of the 512 kilobit per second clock frequency signal and sampled in the center of the bit period of the rising edge of the 512 kilobit per second clock frequency signal. These clock frequency signals are illustrated in both FIGS. 14 and 17. Channel unit signalling is bit synchronous with its corresponding data bit. These channel data and signalling bit relationships are common at the channel unit interface 43 of FIG. 2. In addition, bit synchronization of the T1 and CCITT data streams at the 512 kilobit per second interface aligns the frame sync edges at 8 KHz intervals as illustrated in FIG. 16. These sync pulses are utilized to keep the incoming and outgoing data fully synchronized.

The clock, data bit and frame relationships presented offer the capability of directly converting the T1 receive data buses with the CCITT transmit data buses, and vice versa, to pass through channel data in the T1 to CCITT translator 66 or 94. However, although the frame synchronization signal occurs at 8 KHz for T1 and CCITT signals, the 512 kilobit per second clock rate is actually $514\frac{2}{3}$ KHz per second instantaneous frequency with a single deleted 1.544 megahertz per second clock pulse in data bit 64 to produce the 512 KHz per second average "rate". Since the CCITT clock rate is 512 clock KHz at a constant rate, FIG. 17 shows the T1 clock and sample points tending to precede the corresponding sampling of the CCITT clock, until the T1 justification occurs in data bit 64 at sampling time D. This sampling error is acceptable, since the worst case misalignment near data bit 64 retains a sufficient guard time prior to justification. With the frequencies illustrated, this guard time is always at least 332 nanoseconds.

Since CCITT and T1 frames are 8 kilohertz periodic, equal numbers of CCITT or T1 frames are equivalent in duration. Referring to FIGS. 3 and 6, the T1 multiframe requires 12 frames while the CCITT multiframe contains 16 frames. FIG. 16 illustrates a 48 frame equivalent period consisting of three CCITT multiframes or four T1 multiframes. This 48 frame period is delineated by the CCITT/T1 sync pulse, such as pulses 314 and 316.

One multiframe in either T1 or CCITT contains one complete set of signalling information for all channel time slots. Since four T1 multiframes occur in the same period as three CCITT multiframes, an extra set of channel signalling information is produced by the T1 data stream. Signalling information carrying telephone status, such as on-hook and off-hook signals, changes state at a low frequency rate compared to the high speed data stream. Therefore, in the CCITT to T1 translation, the signalling states used in T1 multiframe 3 are are output again in T1 multiframe 4. In the T1 to CCITT translation, the signalling information being input in T1 multiframe 4 is deleted. This deletion is not detrimental to signalling operation since much of the signalling information overlaps between multiframes. Orientation of the channel signalling information to be accepted by either T1 or CCITT inputs is coordinated by the serial data controllers in the T1 and CCITT transmit and receive units as shown in FIG. 9 by blocks 62, 76, 98 and 88.

While we have described one embodiment of apparatus for interfacing data channel banks of two different configurations directly without converting to voice frequency, using the concept of dividing up the serial data into enough channels of parallel data buses that shifting of the reference points of the data being transmitted does not exceed one-half cycle of a bus clocking rate before commencing a new frame of channel information, we wish to be limited not by the embodiment illustrated, but only by the scope of the appended claims, wherein we claim:

1. Apparatus for interfacing data channel banks of two different configurations directly without converting to voice frequency comprising, in combination:

first means for supplying and receiving serial information bits at a first clock rate C1 for a plurality of channels N, where the serial bits include both data words for each channel embedded with signalling information and a single bit of frame alignment information for each frame of information;

second means for supplying and receiving serial information bits at a second clock rate C2 for a plurality of channels N+M+S where the serial bits of channels M and N include only data and the serial bits of channels S include only signalling information; and interface means, connecting said first means to said second means, said interface means including means for passing only N channels of data in both directions between said first and said second means in real time whereby the serial bit streams are divided into enough parallel data buses that shifting of common reference points on the digital data bits being transmitted does not exceed $\frac{1}{2}$ cycle of a data bus clocking rate before commencing a new frame of channel information.

2. The method of interfacing data channel banks of two different configurations directly without converting to voice frequency comprising the steps of:

supplying and receiving serial information bits at a first clock rate C1 for a plurality of channels N, where the serial bits include both data words for each channel embedded with signalling information and a single bit of frame alignment information for each frame of information;

supplying and receiving serial information bits at a second clock rate C2 for a plurality of channels N+M+S where the serial bits of channels M and N include only data and the serial bits of channels S include only signalling information; and passing only N channels of digital data between said first and said second means in both directions in real time whereby the serial digital data bit streams are divided into enough parallel digital data streams that shifting of common reference points on the digital data bits being transmitted does not exceed $\frac{1}{2}$ cycle of a data stream clocking rate before commencing a new frame of channel information.

3. The method of providing real time digital bit interfacing between CCITT and T1 communication channels comprising the steps of:

receiving data frames comprising 30 channels of data and 2 channels of signalling information;

detecting a submultiple timing signal equal in frequency to 1 cycle per frame of received information;

converting 24 channels of data to 3 parallel streams of digital data, each of said parallel streams of digital data being generated simultaneously in a time-multiplexed manner;

detecting said signaling information from said two channels of received information; and recombining said 3 parallel streams of digital data with said detected signaling information to produce a serial T1 communication data channel.

4. The method of claim 3 wherein the converting includes the translation of digital data from CCITT to T1 compression algorithm result values.

5. Apparatus for providing real time digital bit interfacing between CCITT and T1 communication channels comprising, in combination:

first means for receiving data frames of serially supplied digital data comprising 30 channels of data and 2 channels of signalling information;

second means, connected to said first means, for detecting a submultiple timing signal equal in frequency to 1 cycle per frame of received information;

third means, connected to said first means, for converting 24 channels of the received digital data to 3 parallel streams of digital data, each of said parallel streams of digital data being generated simultaneously in a time-multiplexed manner;

fourth means, connected to said first means, for detecting said signaling information from said two channels of received information; and recombining fifth means, connected to said second, third and fourth means, for receiving signals therefrom and for recombining said 3 parallel streams of digital data with said detected signaling information to produce a serial T1 communication data channel.

6. Apparatus as claimed in claim 5 comprising in addition:

means, comprising a part of said third means, for converting from CCITT to T1 compression algorithm result values before the recombination of data.

7. Apparatus for providing real time digital bit interfacing between T1 and CCITT communication channels comprising, in combination:

first means for receiving data frames of serially supplied digital data each frame comprising 24 channels of data and 1 bit of signalling information;

second means, connected to said first means, for detecting a submultiple timing signal equal in frequency to 1 cycle per frame of received information;

third means, connected to said first means, for converting the 24 channels of the received digital data to 3 parallel streams of digital data, each of said parallel streams of digital data being generated simultaneously in a time-multiplexed manner;

fourth means, connected to said first means, for detecting said signaling information from said data frames of received information; and fifth means for receiving 6 channels of voice data;

recombining sixth means, connected to said second, third, fourth and fifth means, for receiving signals therefrom and for recombining said 3 parallel streams of digital data and said 6 channels of voice data with said detected signaling information to produce a serial CCITT communication data channel.

8. Apparatus as claimed in claim 7 comprising in addition:

means, comprising a part of said third means, for converting from T1 to CCITT compression algorithm result values before the recombination of data.

* * * * *